March 13, 1956

L. KROZALESKI 2,737,748

FISHING LURE

Filed March 22, 1954

INVENTOR.

LEO KROZALESKI

BY

*Whittemore, Hulbert & Belknap*

ATTORNEYS

United States Patent Office 2,737,748
Patented Mar. 13, 1956

2,737,748

FISHING LURE

Leo Krozaleski, Detroit, Mich.

Application March 22, 1954, Serial No. 417,571

5 Claims. (Cl. 43—26.2)

This invention relates to a fishing lure and more particularly to one which is especially adapted to be drawn through the water as in casting or trolling.

One object of this invention is to provide a fishing lure having a body simulating a fish and which appears to be alive.

Another object of the invention is to provide a fishing lure simulating a fish which has a movable jaw, and means for opening and closing the jaw during movement of the lure through the water. As a feature of the invention, a propeller is mounted at the head end of the lure for rotation by the flow of water. The propeller is connected to the jaw to oscillate the latter in accordance with the rotation of the propeller.

Another object of the invention is to provide a fishing lure which will bob and weave as it is drawn through the water, thereby imitating the activity of a live bait.

Other objects of the invention will become apparent as the following description proceeds, especially when taken in conjunction with the accompanying drawing, wherein.

Figure 1:
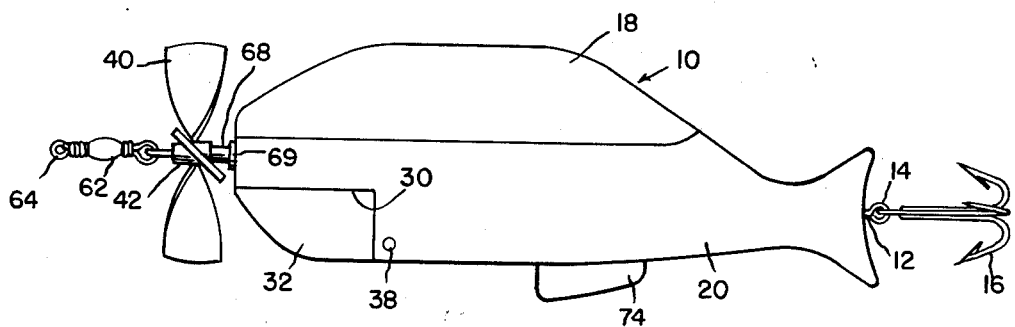
Figure 1 is a side elevational view of a fishing lure constructed in accordance with the present invention.
Figure 2:
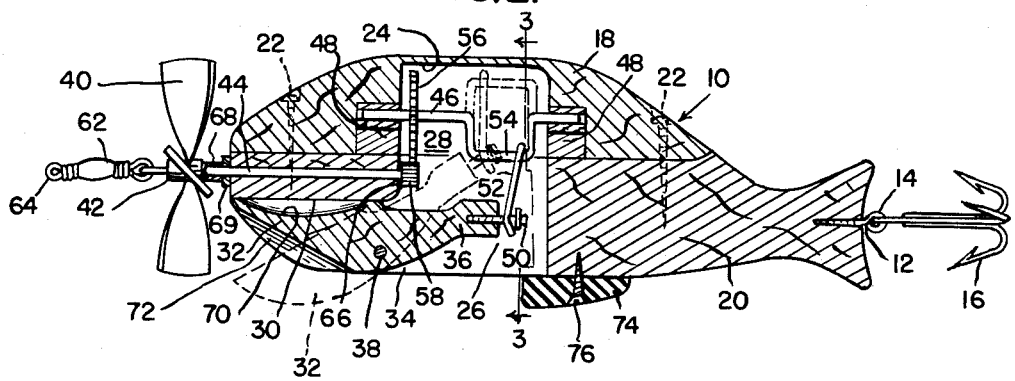
Figure 2 is a vertical longitudinal sectional view of the fishing lure shown in Figure 1.

Referring now more particularly to the drawing, and especially to Figures 1 and 2 thereof, the fishing lure there shown, will be seen to comprise a body generally indicated at 10 which is shaped to simulate a fish. A screw 12 is threaded into the rear or tail end of the body and has an eyelet 14 to which a hook 16 is pivoted.

The body 10 may be made of any suitable material such as wood or plastic and for convenience is manufactured in two sections, a top section 18 and a bottom section 20. These sections are removably secured together by screws 22.

The underside of the top section is hollowed out centrally as indicated at 24, and the top side of the bottom section is similarly hollowed out as shown at 26, this hollowed out portion, however, extending entirely to the underside of the bottom section. The hollowed out portions of the two sections cooperate to define a chamber 28 when the body sections are assembled, as seen in Figure 2.

Figure 3:
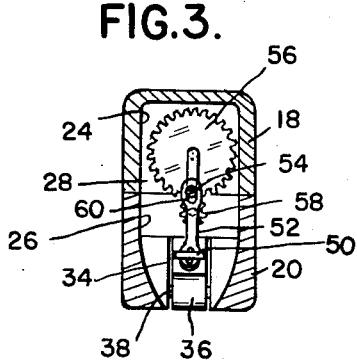
Figure 3 is a cross sectional view taken along the line 3—3 on Figure 2.

It will also be noted that the front or head end of the bottom section is cut away as shown at 30 to accommodate the movable jaw 32. A passage 34 leading from the chamber opens into the cut away portion 30, the passage 34 receiving the inward extension 36 of the jaw which projects into chamber 28. As will be seen in Figures 1, 2 and 3, a pivot pin 38 extends transversely of the body and spans passage 34. The pin 38 extends through the opening 39 of the jaw to pivotally support the jaw for up and down swinging movement between the solid line position and the dotted line position shown in Figure 2.

A propeller 40 is mounted on the head end of the body. The propeller has a hub 42 which is soldered or otherwise permanently secured to the propeller shaft 44 which extends longitudinally of the body and which is journalled in the bottom section 20 of the body for rotation. The propeller is, of course, rotated by the flow of water as the body is drawn therethrough. The propeller is connected to jaw 32 in such a way as to cause the jaw to move up and down in accordance with the spinning of the propeller, as will appear more fully hereinafter.

A crankshaft 46 extends lengthwise of the body across chamber 28 and has its opposite ends rotatably supported in bearings mounted in the top section of the body. The inserts 48 are removably secured in the top section underneath the crankshaft bearings to permit the crankshaft and bearings to be arranged in the assembly as shown in Figure 2. A pin 50 is secured to the inner end of the extension 36 of the jaw and a connecting rod 52 connects the pin 50 to the offset portion 54 of the crankshaft. The crankshaft has a gear 56 secured thereon which meshes with a pinion 58 carried by the inner end of the propeller shaft whereby rotation of the propeller will cause the jaw 32 to oscillate up and down. It will be noted in Figures 2 and 3 that the gear 56 is of substantially greater diameter than the pinion 58, and the gear and pinion thus constitute reduction gearing for driving the crankshaft 46 by the propeller, but at a considerably slower rate. The provision of reduction gearing is desirable in that it increases the power available for turning the crankshaft and hence for swinging the jaw 32. In some instances, and particularly where no reduction gearing is provided, it is possible that insufficient power will be available to swing the jaw and the result might be that the entire assembly will turn as a unit with the propeller. Suitable reduction gearing avoids all possibility of such an occurrence. It will be noted that the connecting rod 52 has a somewhat enlarged opening 60 for receiving the offset portion 54 of the crankshaft, permitting the connecting rod 52 to shift forwardly and rearwardly along the offset portion during rotation of the crankshaft.

A swivel type member 62 is pivotally connected to the hub of the propeller, having an eyelet 64 at its front end for attachment to a fishing line. A suitable anti-friction washer 66 may be interposed between pinion 58 and the adjacent surface of the bottom section of the body. Likewise, another anti-friction sleeve 68 is mounted on the propeller shaft between the hub and the head end of the bottom section, preventing the propeller and shaft from shifting rearwardly relative to the body. Interposed between the sleeve 68 and the front end of the body is another anti-friction washer 69.

Figure 4:
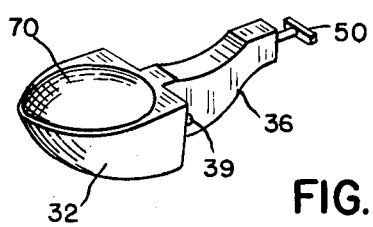
Figure 4 is a detail perspective view of the movable jaw member.
Figure 5:
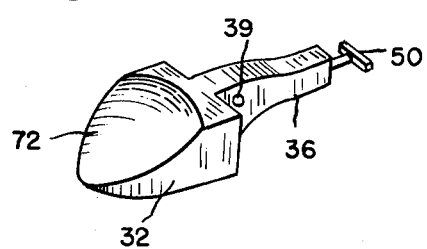
Figure 5 is similar to Figure 4 but shows the jaw member in inverted position.

In Figure 4 of the drawing, it will be noted that the upper side of the jaw is hollowed out as shown at 70. Thus, when the jaw is in the open position shown in dotted lines in Figure 2, the flow of water directed against the hollowed out portion 70 will tend to deflect the lure and cause it to bob and weave simulating the activity of live bait. Likewise, the underside of the jaw is hollowed out as at 72 for causing the lure to bob and weave, particularly when the jaw is in the solid line position shown in Figure 2. The presence of the reduction gearing slows down the swinging movement so that the recessed or hollowed out portions 70 and 72 are more effective in causing the lure to bob and weave.

It will be noted that the jaw 32 is positioned to receive the backwash from the propeller so that the force of the water directed against the hollowed out surfaces of the jaw is increased, accentuating the bobbing and weaving of the lure.

It will thus be seen that as the fishing lure is drawn through the water, the same will bob and weave, that is, dive downwardly and upwardly and turn to the right and to the left to simulate a live bait. In addition, the action of the jaw constantly moving up and down imitates the action of a live fish going after a fly, for example.

If desired, or found to be necessary, a suitable weight 74 may be secured to the underside of the body by means of a screw 76.

The propeller may be made of a flexible material such as sheet metal, so that the blades can be easily bent to different angles to alter the speed of rotation of the propeller and accordingly the speed of opening and closing of the jaw. By thus bending the blades to different angles, the bobbing and weaving action can also be controlled.

What I claim as my invention is:

1. An artificial fishing lure comprising a body shaped to simulate a fish, said body having a jaw at the front end portion thereof, means pivotally mounting said jaw on said body for up and down swinging movement about an axis extending transversely of said body, a propeller mounted on the front end of said body for rotation about an axis extending lengthwise of said body, said propeller being rotatable by the flow of water as the body is drawn therethrough, and means interconnecting said propeller and said jaw for swinging the latter up and down in accordance with the rotation of said propeller.

2. An artificial fishing lure comprising a body shaped to simulate a fish, said body having a jaw member at the lower front end portion thereof, means pivotally mounting said jaw member on said body for up and down swinging movement about an axis extending transversely of said body, a propeller mounted on the front end of said body for rotation about an axis extending lengthwise of said body, said propeller being rotatable by the flow of water as said body is drawn therethrough, means interconnecting said propeller and said jaw member for swinging the latter up and down in accordance with the rotation of said propeller, said jaw member having a concave recess causing said body to bob and weave as it is drawn through the water by the flow of water against said concave surface, said propeller being mounted directly in front of said jaw member in a position such that the backwash from said propeller is directed against said concave recess to accentuate the bobbing and weaving of said body.

3. An artificial fishing lure comprising a body shaped to simulate a fish, said body having a recess in the lower part of the front end portion thereof, a jaw member located in said recess and being pivotally mounted on said body for up and down swinging movement between closed and open positions respectively about an axis extending transversely of said body, a propeller mounted on the front end of said body for rotation about an axis extending lengthwise of said body, said propeller being rotatable by the flow of water as said body is drawn therethrough, means interconnecting said propeller and said jaw member for swinging the latter up and down in accordance with the rotation of said propeller, said jaw member having a downwardly and forwardly facing surface formed with a concave recess causing said body to bob and weave as it is drawn through the water by the flow of water against said concave surface particularly when said jaw member is swung upwardly to closed position, said propeller being mounted directly in front of said jaw member in a position such that the backwash from said propeller is directed against said concave recess to accentuate the bobbing and weaving of said body.

4. An artificial fishing lure comprising a body shaped to simulate a fish, said body having a recess in the lower part of the front end portion thereof, a jaw member located in said recess and being pivotally mounted on said body for up and down swinging movement between closed and open positions respectively about an axis extending transversely of said body, a propeller mounted on the front end of said body for rotation about an axis extending lengthwise of said body, said propeller being rotatable by the flow of water as said body is drawn therethrough, means interconnecting said propeller and said jaw member for swinging the latter up and down in accordance with the rotation of said propeller, said jaw member having a concave recess in its top surface covered by the first-mentioned recess when said jaw member is swung upwardly to closed position and exposed to the flow of water when said jaw member is swung downwardly to open position causing said body to bob and weave as it is drawn through the water, said propeller being mounted directly in front of said jaw member in a position such that the backwash from said propeller is directed against said concave recess to accentuate the bobbing and weaving of said body.

5. An artificial fishing lure comprising a body shaped to simulate a fish, said body having a recess in the lower part of the front end portion thereof, a jaw member located in said recess and being pivotally mounted on said body for up and down swinging movement between closed and open positions respectively about an axis extending transversely of said body, a propeller mounted on the front end of said body for rotation about an axis extending lengthwise of said body, said propeller being rotatable by the flow of water as said body is drawn therethrough, means interconnecting said propeller and said jaw member for swinging the latter up and down in accordance with the rotation of said propeller, said jaw member having a concave recess in its top surface covered by the first-mentioned recess when said jaw member is swung upwardly to closed position and exposed to the flow of water when said jaw member is swung downwardly to open position causing said body to bob and weave as it is drawn through the water, said jaw member having a downwardly and forwardly facing surface formed with a concave recess causing said body to bob and weave as it is drawn through the water by the flow of water against the last-mentioned concave recess particularly when said jaw is swung upwardly to closed position, said propeller being mounted directly in front of said jaw member in a position such that the backwash from said propeller is directed against said concave recesses to accentuate the bobbing and weaving of said body.

References Cited in the file of this patent

UNITED STATES PATENTS

| | | |
|---|---|---|
| 966,068 | Williamson | Aug. 2, 1910 |
| 1,223,372 | Di Zerega | Apr. 24, 1917 |
| 1,740,521 | Nelson | Dec. 24, 1929 |
| 1,948,005 | Pflueger | Feb. 20, 1934 |
| 2,448,523 | Fibiger | Sept. 7, 1948 |
| 2,598,012 | Prieur | May 27, 1952 |
| 2,627,136 | Sinclair | Feb. 3, 1953 |